US008467887B2

(12) United States Patent
Jung et al.

(10) Patent No.: US 8,467,887 B2
(45) Date of Patent: Jun. 18, 2013

(54) SYSTEM FOR CONTROLLING LIGHTING DEVICES

(75) Inventors: Jin Sun Jung, Gyeonggi-do (KR); Chang Seob Kim, Seoul (KR); Dong Won Lee, Gyeonggi-do (KR); Ho Chan Cho, Gyeonggi-do (KR)

(73) Assignee: Samsung Electronics Co., Ltd., Seoul (KR)

( * ) Notice: Subject to any disclaimer, the term of this patent is extended or adjusted under 35 U.S.C. 154(b) by 379 days.

(21) Appl. No.: 12/696,490

(22) Filed: Jan. 29, 2010

(65) Prior Publication Data

US 2011/0112661 A1 May 12, 2011

(30) Foreign Application Priority Data

Nov. 9, 2009 (KR) ........................ 10-2009-0107527

(51) Int. Cl.
*G05B 11/00* (2006.01)

(52) U.S. Cl.
USPC ................... 700/19; 700/17; 700/23; 700/24; 700/25

(58) Field of Classification Search
USPC ...................................................... 700/17, 83
See application file for complete search history.

(56) References Cited

U.S. PATENT DOCUMENTS 4,924,151 A * 5/1990 D'Aleo et al. ................ 315/295
5,530,322 A * 6/1996 Ference et al. ................ 315/295
5,677,603 A * 10/1997 Speirs et al. .................. 315/324
5,909,087 A * 6/1999 Bryde et al. .................. 315/149
6,046,550 A * 4/2000 Ference et al. ................ 315/291
6,927,547 B2 * 8/2005 Walko et al. .................. 315/316
7,221,110 B2 * 5/2007 Sears et al. .................... 315/312
7,355,523 B2 * 4/2008 Sid .............................. 340/9.16
7,502,034 B2 * 3/2009 Chemel et al. ................ 345/594
2004/0105264 A1 * 6/2004 Spero ............................ 362/276
2005/0035717 A1 * 2/2005 Adamson et al. ............. 315/150
2008/0140231 A1 * 6/2008 Blackwell et al. .............. 700/90
2010/0072904 A1 * 3/2010 Eckel et al. ............... 315/185 R
2010/0134042 A1 * 6/2010 Willaert ........................ 315/294
2011/0035404 A1 * 2/2011 Morgan et al. ................ 707/769

FOREIGN PATENT DOCUMENTS

JP 10-116688 5/1998
KR 10-2006-0134238 A 12/2006
KR 10-0719504 B1 5/2007

(Continued)

OTHER PUBLICATIONS

U.S. Appl. No. 61/017,878, filed Dec. 2007, Morgan et al.*
Kim, et al. "The Design and Implementation of the Lamp Facility Management System based on Sensors." *The Korean Institute of Marine Information and Communication Services*. 11. No. 7 (2007): 1325-1331.

(Continued)

*Primary Examiner* — Ronald Hartman, Jr.
(74) *Attorney, Agent, or Firm* — McDermott Will & Emery LLP

(57) ABSTRACT

Disclosed is a lighting control system including: a switching means for selecting one of a plurality of scenarios; a gateway for matching at least one of on/off control signals, color temperature control signals, color control signals, or dimming control signals for a plurality of lamps with the plurality of scenarios, storing a resultant data, and outputting control signals matched with the scenario selected from the switching means; and a lighting device for receiving the control signals outputted from the gateway, and according to the received control signals, turning on/off each of the lamps, adjusting a color temperature or a color of each of the lamps, or a dimming level of each of the lamps.

3 Claims, 3 Drawing Sheets

FOREIGN PATENT DOCUMENTS

| | | | |
|---|---|---|---|
| KR | 10-0719504 | B1 | 5/2007 |
| KR | 10-0724795 | B1 | 5/2007 |
| KR | 10-0724585 | A | 6/2007 |
| KR | 10-0724585 | B1 | 6/2007 |
| KR | 10-0873905 | B1 | 12/2008 |
| KR | 10-0911261 | B1 | 7/2009 |

OTHER PUBLICATIONS

International Search Report issued for International Patent Application No. PCT/KR2010/007654, dated Jul. 1, 2011.

Korean Office Action issued in Korean Patent Application No. 10-2009-0107527 dated Apr. 1, 2011.

* cited by examiner

SYSTEM FOR CONTROLLING LIGHTING DEVICES

CROSS-REFERENCE TO RELATED APPLICATIONS

This application claims the benefit of Korean Patent Application No. 10-2009-0107527 filed with the Korea Intellectual Property Office on Nov. 9, 2009, the disclosure of which is incorporated herein by reference.

BACKGROUND OF THE INVENTION

1. Field of the Invention

The present invention relates to a system for controlling a plurality of lamps of a lighting device through wireless communication, thereby adjusting on/off of lamps, a color temperature, or a dimming level according to a preset scenario.

2. Description of the Related Art

A lighting device refers to a device which produces bright light enough to be recognized through his/her eyes to thereby make dark places lighter. A Light Emitting Diode LED, a fluorescent lamp, an incandescent lamp, and so on are mainly used as a lighting device.

In general, on/off of each lamp in a lighting device is controlled through connection of each lamp to a switching means, or through wired-connection of a plurality of lamps in one wire.

In recent, researches on a variety of technologies have been actively conducted to develop environment-friendly LED and digital-based lighting control. Moreover, various studies have been in progress to provide a dimming technology for adjusting brightness of a lamp, as well as a technology for adjusting color temperatures affecting learning effect.

Furthermore, there has been actively conducted a technology for automatically controlling all lighting devices within a building, and a technology for controlling lighting devices within a building in real time in a digital manner.

A system for controlling lighting devices so that lighting moods can be variously made depending on user's environment has been developed together with a technology for controlling lighting devices in consideration of user's convenience.

That is, there have been studied various technologies, which include a technology for individually controlling off of desired lamps from among a plurality of lamps, a technology for adjusting dimming by setting brightness of lamps to be constant, and a technology for adjusting colors or color temperatures of lamps according to user's environment.

SUMMARY OF THE INVENTION

The present invention has been proposed in order to overcome the above-described problems and it is, therefore, an object of the present invention to provide a lighting control system in which signals to control a plurality of lamps are wirelessly transmitted according to a preset scenario, so that it is possible to set a lighting mood corresponding to the scenario.

In accordance with one aspect of the present invention to achieve the object, there is provided a lighting control system including: a gateway for selecting at least one of on/off control signals, color temperature control signals, color control signals, dimming control signals for a plurality of lamps, according to each of preset scenarios, and outputting the selected control signals; and a lighting device for receiving the control signals outputted from the gateway, and according to the received control signals, turning on/off each of the lamps, adjusting a color temperature or a color of each of the lamps, or adjusting a dimming level of each of the lamps.

In accordance with still another aspect of the present invention to achieve the object, there is provided a lighting control system including: a switching means for selecting one of a plurality of scenarios; a gateway for matching at least one of on/off control signals, color temperature control signals, color control signals, or dimming control signals for a plurality of lamps with the plurality of scenarios, storing a resultant data, and outputting control signals matched with the scenario selected from the switching means; and a lighting device for receiving the control signals outputted from the gateway, and according to the received control signals, turning on/off each of the lamps, adjusting a color temperature or a color of each of the lamps, or a dimming level of each of the lamps.

Also, the switching means may be integrated with the gateway.

Also, the switching means may be constructed separately from the gateway, and information on the scenario selected from the switching means may be transmitted to the gateway through local area wireless communication.

Also, the gateway may include a data storing unit for storing a table which contains addresses, on/off control signals, color temperature control signals, color control signals, or dimming control signals for the plurality of lamps, according to each of the scenarios.

Also, the data storing unit may store addresses, on/off control signals, color temperature control signals, color control signals, or dimming control signals for the plurality of lamps, according to each of the scenarios, which can be programmable on the table.

Also, the on/off control signals, color temperature control signals, color control signals, or dimming control signals may be transmitted from the gateway to the lighting device through local area wireless communication.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERABLE EMBODIMENTS

Figure 1:
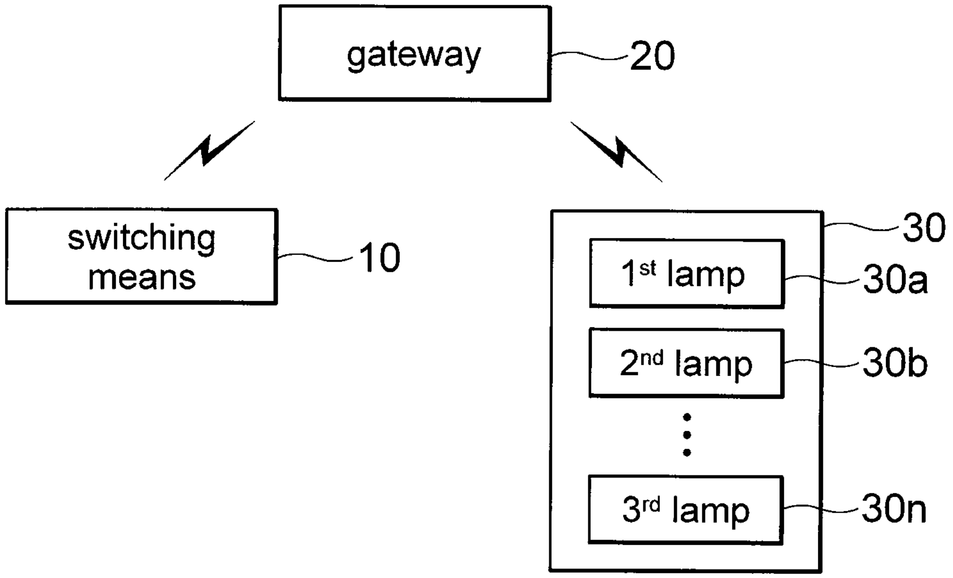
FIG. 1 is a schematic view showing a construction of a lighting control system in accordance with an embodiment of the present invention.

As the invention allows for various changes and numerous embodiments, particular embodiments will be illustrated in the drawings and described in detail in the written description. However, this is not intended to limit the present invention to particular modes of practice, and it is to be appreciated that all changes, equivalents, and substitutes that do not depart from the spirit and technical scope of the present invention are encompassed in the present invention.

In the description of the present invention, certain detailed explanations of related art are omitted when it is deemed that they may unnecessarily obscure the essence of the invention.

FIG. 1 is a schematic view showing a construction of a lighting control system in accordance with an embodiment of the present invention.

As shown in FIG. 1, the lighting control system includes a switching means 10, a gateway 20, and a lighting device 30. The lighting device 30 includes a plurality of lamps **30*a* to 30*n***.

The switching means 10 may select any one of a plurality of scenarios, and may be manufactured in such a shape as a switch affixed on a wall and a portable remote controller. Moreover, the switching means 10 may be integrated with the gateway 20, or may also be constructed separately from the gateway 20.

If the switching means 10 may be integrated with the gateway 20, the gateway 20 may have a button formed on the outside thereof so that a user can select a desired scenario.

If the switching means 10 may be constructed separately from the gateway 20, it is possible to transmit information of the scenario selected by the switching means 10 to the gateway 20 through wired/wireless communication.

Herein, the wireless communication is made by local area wireless communication technologies, such as Bluetooth and Zigbee, and since they support two-way communication, it can check a state of a counterpart's device.

The gateway 20 matches any one of on/off control signals, color temperature control signals, color control signals, or dimming control signals for a plurality of lamps **30*a* to 30*n*, with a plurality of scenarios, and stores a resultant data. Then, the gateway 20 outputs corresponding control signals matched with the scenario which the switching means 10** selects.

The gateway 20 may include a data storing unit which stores a table containing on/off control signals, color temperature control signals, color control signals, dimming control signals, or addresses for a plurality of lamps **30*a* to 30*n*** according to each scenario.

Addresses, on/off control signals, color temperature control signals, color control signals, or dimming control signals for a plurality of lamps **30*a* to 30*n*** can be programmable on the table according to each scenario, so the user can store a new scenario for new lighting mood.

The lighting device 30 receives control signals outputted from the gateway 20 and drives each lamp according to the received control signals.

The lighting device 30 may use a digital lighting (in particular, Light Emitting Diode LED) in which dimming level control may be made.

Figure 2:
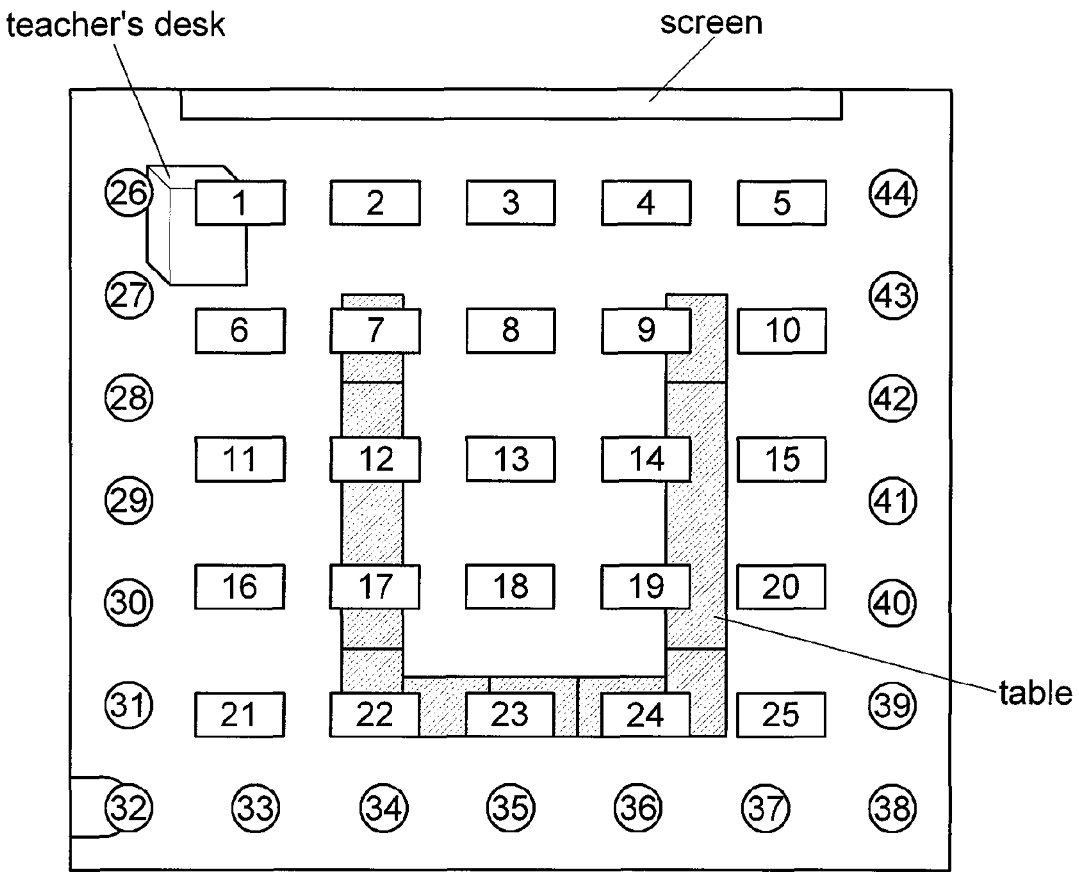
FIGS. 2 and 3 are views showing a state in which a lighting control system in accordance with an embodiment of the present invention is used.
Figure 3:
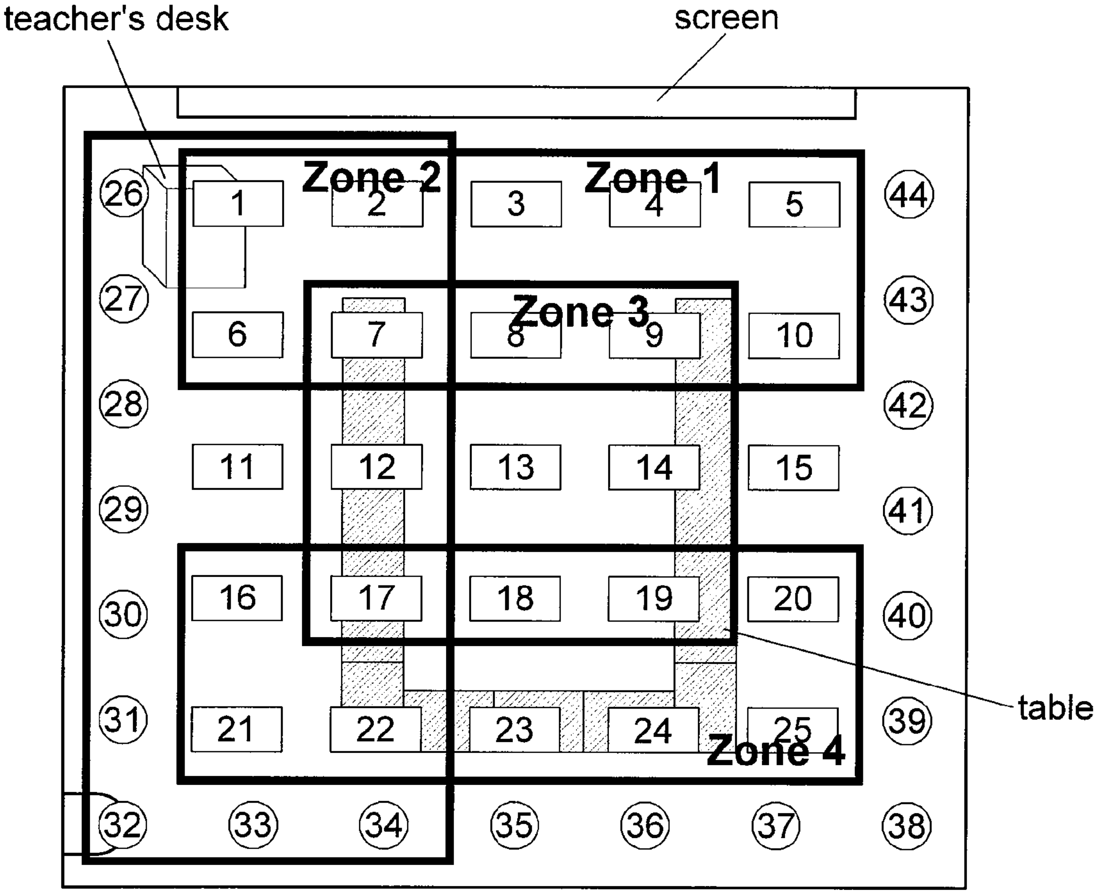

FIGS. 2 and 3 are views showing a state in which a lighting control system in accordance with an embodiment of the present invention is used.

FIGS. 2 and 3 shows a case where the lighting control system applies a lighting environment where a plurality of lamps ($1^{st}$ to $44^{th}$) are arranged within a lecture room at a predetermined space, a screen is installed in front of the lecture room, and a table is set in a 'U' shape.

A lighting mood of the lecture room may be diversely made for each scenario, such as presentation, moving picture viewing, lecturing, self-regulated learning or assignment time, talk-time, rest-time, rational thinking time, creative thinking time, memorizing time, and so on.

Table 1 below shows color temperatures, dimming operation, or on/off of a plurality of lamps according to nine scenarios.

TABLE 1

| No. switching means | Scenario | Lamp address |
|---|---|---|
| 1 | Presentation | 1~5, 26, 44: off<br>6~25, 27~43: on |
| 2 | Moving picture viewing | 1~5, 26, 44: off<br>6~10: 5-step dimming<br>11~25, 27~43: on |
| 3 | Lecturing | 1, 2, 6, 26, 27: on<br>3~5, 7~25, 28~44: 5-step dimming |
| 4 | Self-regulated learning or Assignment time | 7~9, 12~14, 17~19, 22~24: on<br>1~6, 10, 11, 15, 16, 20, 21, 25~44: 5-step dimming |
| 5 | Talk-time | 1~44: 7-step dimming |
| 6 | Rest-time | 1~25: 5-step dimming<br>26~44: on |
| 7 | Rational thinking time | 1~25: color temperature 6500 K<br>26~32: color temperature 4500 K<br>33~44: color temperature 4000 K |
| 8 | Creative thinking time | 1~25: color temperature 3000 K<br>26~32: color temperature 2500 K<br>33~44: color temperature 2700 K |
| 9 | Memorizing time | 1~25: color temperature 4000 K<br>26~32: color temperature 3500 K<br>33~44: color temperature 3800 K |

When the user wanting a lighting mood for presentation presses a '1' button, scenario information corresponding to '1' button is transmitted from the switching means to the gateway.

The gateway may output control signals to turn on/off lamps according to a presentation scenario corresponding to '1' button of the switching means. In this case, lamps ($1^{st}$ to $5^{th}$, $26^{th}$ and $44^{th}$) are turned off, and other lamps ($6^{th}$ to $25^{th}$, $27^{th}$ to $43^{rd}$) are turned on.

Also, as shown in FIG. 3, when lighting moods are made in different ways after the lecture room is divided into several zones, the gateway may output different control signals to corresponding lamps installed in the zones, respectively.

In this case, the data storing unit of the gateway may store various control signals in the format of Table 2 below, wherein the control signals include on/off control signals, color temperature control signals, dimming control signals, or addresses for a plurality of lamps according to each scenario.

TABLE 2

| | 1 | 2 | 3 | 4 | 5 | 6 | 7 | 8 | 9 | 10 | . . . | 42 | 43 | 44 |
|---|---|---|---|---|---|---|---|---|---|---|---|---|---|---|
| Scenario 1 | off | off | off | off | off | on | on | on | on | on | | on | on | off |
| Scenario 2 | off | off | off | off | off | 5-D | 5-D | 5-D | 5-D | 5-D | | on | on | off |
| Scenario 3 | on | on | 5-D | 5-D | 5-D | on | 5-D | 5-D | 5-D | 5-D | | 5-D | 5-D | 5-D |

Therefore, according to a lighting control system of the present invention, it is possible to make lighting moods desired by a user in various ways without having to change wires of lamps.

In accordance with an embodiment of the present invention, it is possible to individually control lamps of a lighting device by storing control signals corresponding to an address of each lamp, according to a preset scenario, on the gateway.

Moreover, it is possible to set various scenarios according to a lighting mood desired by each user, and to reuse a set scenario by programming the set scenario on the gateway, which results in simple design and low cost. which results in simple design and low cost.

Furthermore, it is possible to adjust color temperatures, colors, a dimming level, on/off of each lamp at the same time, so that various lighting moods can be achieved by setting of each user.

As described above, although the preferable embodiments of the present invention have been shown and described, it will be appreciated by those skilled in the art that substitutions, modifications and variations may be made in these embodiments without departing from the principles and spirit of the general inventive concept, the scope of which is defined in the appended claims and their equivalents.

What is claimed is:

1. A lighting control system comprising:

a gateway for matching at least one of on/off control signals, color temperature control signals, color control signals, or dimming control signals for a plurality of lamps with a plurality of scenarios, and storing a resultant data, said gateway selecting at least one of the on/off control signals, color temperature control signals, color control signals, or dimming control signals for the plurality of lamps, according to a received scenario, and outputting the selected control signals; and a lighting device for receiving the selected control signals outputted from the gateway, and according to the received control signals, turning on/off each of the lamps, adjusting a color temperature or a color of each of the lamps, or adjusting a dimming level of each of the lamps, wherein the gateway outputs different control signals to corresponding lamps installed in respective zones, wherein the gateway includes a data storing unit for storing a table which contains addresses, on/off control signals, color temperature control signals, color control signals, or dimming control signals for the plurality of lamps, according to each of the scenarios, and wherein the data storing unit stores addresses, on/off control signals, color temperature control signals, color control signals, or dimming control signals for the plurality of lamps, according to each of the scenarios, which can be programmable on the table.

2. A lighting control system comprising:

a switching means for selecting one of a plurality of scenarios;

a gateway for matching at least one of on/off control signals, color temperature control signals, color control signals, or dimming control signals for a plurality of lamps with the plurality of scenarios, storing a resultant data, and outputting control signals matched with the scenario selected from the switching means; and a lighting device for receiving the control signals outputted from the gateway, and according to the received control signals, turning on/off each of the lamps, adjusting a color temperature or a color of each of the lamps, or a dimming level of each of the lamps, wherein the gateway outputs different control signals to corresponding lamps installed in respective zones, wherein the gateway includes a data storing unit for storing a table which contains addresses, on/off control signals, color temperature control signals, color control signals, or dimming control signals for the plurality of lamps, according to each of the scenarios, wherein the data storing unit stores addresses, on/off control signals, color temperature control signals, color control signals, or dimming control signals for the plurality of lamps, according to each of the scenarios, which can be programmable on the table, and wherein the switching means is constructed separately from the gateway, and information on the scenario selected from the switching means is transmitted to the gateway through local area wireless communication.

3. The lighting control system of claim 1 or 2, wherein the on/off control signals, color temperature control signals, color control signals, or dimming control signals are transmitted from the gateway to the lighting device through local area wireless communication.

* * * * *